US008402029B2

(12) United States Patent
Valdes-Perez et al.

(10) Patent No.: US 8,402,029 B2
(45) Date of Patent: *Mar. 19, 2013

(54) CLUSTERING SYSTEM AND METHOD

(75) Inventors: Raul Valdes-Perez, Pittsburgh, PA (US); Andre dos Santos Lessa, Pittsburgh, PA (US); Christopher Palmer, Pittsburgh, PA (US); Jerome Pesenti, Pittsburgh, PA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/194,609

(22) Filed: Jul. 29, 2011

(65) Prior Publication Data

US 2011/0313990 A1    Dec. 22, 2011

Related U.S. Application Data

(62) Division of application No. 11/774,908, filed on Jul. 9, 2007, now Pat. No. 8,019,760.

(51) Int. Cl.
*G06F 17/30* (2006.01)

(52) U.S. Cl. ........ 707/737; 707/708; 707/722; 707/736; 707/740; 707/752; 707/706; 707/731

(58) Field of Classification Search .................. 707/706, 707/708, 722, 736, 740, 752, 731, 737
See application file for complete search history.

(56) References Cited

U.S. PATENT DOCUMENTS

| 4,636,974 | A | * | 1/1987 | Griffin | 711/165 |
|---|---|---|---|---|---|
| 5,483,650 | A | * | 1/1996 | Pedersen et al. | 707/2 |
| 5,590,250 | A | * | 12/1996 | Lamping et al. | 345/427 |
| 5,721,939 | A | * | 2/1998 | Kaplan | 704/9 |
| 5,787,420 | A | * | 7/1998 | Tukey et al. | 1/1 |
| 5,848,396 | A | * | 12/1998 | Gerace | 705/7.33 |
| 5,857,179 | A | * | 1/1999 | Vaithyanathan et al. | 1/1 |
| 5,911,140 | A | * | 6/1999 | Tukey et al. | 1/1 |
| 5,924,090 | A | * | 7/1999 | Krellenstein | 1/1 |
| 5,999,927 | A | * | 12/1999 | Tukey et al. | 707/5 |
| 6,026,397 | A | * | 2/2000 | Sheppard | 1/1 |
| 6,029,195 | A | * | 2/2000 | Herz | 725/116 |
| 6,078,913 | A | * | 6/2000 | Aoki et al. | 1/1 |
| 6,085,186 | A | * | 7/2000 | Christianson et al. | 1/1 |
| 6,102,969 | A | * | 8/2000 | Christianson et al. | 717/146 |
| 6,167,369 | A | * | 12/2000 | Schulze | 704/9 |

(Continued)

OTHER PUBLICATIONS

Stanislaw Osinski and Dawid Wiess, "A Concept-Driven Algorithm for Clustering Search Results", IEEE Intelligent Systems, vol. 20, Issue 3, May/Jun. 2005, pp. 48-54.

(Continued)

*Primary Examiner* — Frantz Coby
(74) *Attorney, Agent, or Firm* — Terry Carroll; Edell, Shapiro & Finnan, LLC

(57) ABSTRACT

An increase in information available to a user of computing technologies has a tendency to increase the number of topics that are similarly related. Given the large amount of information that is now available, it is increasingly likely that a first set of search results generated in response to an initial search query will contain information that is not of interest to the user. What is needed in the art is a technique to enable a search query to be conducted by taking advantage of linguistic feedback. Furthermore, what is needed is a technique to enable the presentation of search results to be refined in a manner based on what is not of interest to a user, either intrinsically or because the user has already seen and evaluated certain information and next wants to see more or different information.

19 Claims, 7 Drawing Sheets

U.S. PATENT DOCUMENTS

| | | | |
|---|---|---|---|
| 6,240,408 B1 * | 5/2001 | Kaufman | 707/3 |
| 6,272,250 B1 * | 8/2001 | Sun et al. | 382/225 |
| 6,356,879 B2 * | 3/2002 | Aggarwal et al. | 705/26 |
| 6,385,602 B1 * | 5/2002 | Tso et al. | 1/1 |
| 6,393,427 B1 * | 5/2002 | Vu et al. | 707/797 |
| 6,415,282 B1 | 7/2002 | Mukherjea et al. | |
| 6,421,467 B1 * | 7/2002 | Mitra | 382/240 |
| 6,515,681 B1 * | 2/2003 | Knight | 715/751 |
| 6,578,025 B1 * | 6/2003 | Pollack et al. | 1/1 |
| 6,647,383 B1 | 11/2003 | August et al. | |
| 6,728,752 B1 | 4/2004 | Chen et al. | |
| 6,754,626 B2 * | 6/2004 | Epstein | 704/235 |
| 6,845,484 B1 | 1/2005 | Kraft et al. | |
| 6,862,710 B1 * | 3/2005 | Marchisio | 715/206 |
| 6,944,612 B2 * | 9/2005 | Roustant et al. | 707/706 |
| 7,062,487 B1 | 6/2006 | Nagaishi et al. | |
| 7,065,519 B2 * | 6/2006 | Yamaguchi | 707/3 |
| 7,152,064 B2 | 12/2006 | Bourdoncle et al. | |
| 7,386,560 B2 * | 6/2008 | Tan | 707/737 |
| 2002/0055919 A1 | 5/2002 | Mikheev | |
| 2002/0099701 A1 * | 7/2002 | Rippich | 707/5 |
| 2002/0169764 A1 | 11/2002 | Kincaid et al. | |
| 2004/0093321 A1 | 5/2004 | Roustant et al. | |
| 2004/0215657 A1 * | 10/2004 | Drucker et al. | 707/104.1 |
| 2005/0060287 A1 | 3/2005 | Hellman et al. | |
| 2005/0080769 A1 | 4/2005 | Gemmell et al. | |
| 2005/0080770 A1 | 4/2005 | Lueder et al. | |
| 2005/0086217 A1 | 4/2005 | Kraft et al. | |
| 2005/0120006 A1 | 6/2005 | Nye | |
| 2005/0144158 A1 | 6/2005 | Capper et al. | |
| 2006/0004717 A1 | 1/2006 | Ramarathnam et al. | |
| 2006/0026152 A1 | 2/2006 | Zeng et al. | |
| 2006/0117002 A1 | 6/2006 | Swen | |
| 2006/0173819 A1 | 8/2006 | Watson | |

OTHER PUBLICATIONS

Marti A. Hearst and Chandu Karadi, "Cat-a-Cone: An Interactive Interface for Specifying Searches and Viewing Retrieval Results using a Large Category Hierarchy", SIGIR Forum 31, Dec. 1997, Philadelphia, PA, pp. 246-255.

Hua-Jun Zeng, Qi-Cai He, Zheng Chen, Wei-Ying Ma and Jinwen Ma, "Learning to Cluster Web Search Results", Proceedings of the 27th Annual International ACM SIGIR Conference of Research and Development in Information Retrieval, Sheffield, United Kingdom, Jul. 25-29, 2004, pp. 210-217.

Oren Zamir and Oren Etzioni, "Grouper: A Dynamic Clustering Interface to Web Search Results", Department of Computer Science and Engineering, University of Washington, 14 pages.

Office Action mailed from the US Patent Office on Jun. 25, 2009 in U.S. Appl. No. 11/774,908.

Office Action mailed from the US Patent Office on Dec. 1, 2009 in U.S. Appl. No. 11/774,908.

Office Action mailed from the US Patent Office on Feb. 4, 2010 in U.S. Appl. No. 11/774,908.

Office Action mailed from the US Patent Office on Sep. 21, 2010 in U.S. Appl. No. 11/774,908.

Notice of Allowance mailed from the US Patent Office on Jun. 10, 2011 in U.S. Appl. No. 11/774,908.

* cited by examiner

CLUSTERING SYSTEM AND METHOD

CROSS-REFERENCE TO RELATED APPLICATION

This application is a continuation of U.S. patent application Ser. No. 11/774,908, now U.S. Pat. No. 8,019,760, filed Jul. 9, 2007, the entire contents of which are incorporated herein by reference.

FIELD OF THE INVENTION

The invention relates generally to processes associated with information query and retrieval. More specifically, the invention provides for a novel method, system and apparatus for conducting a search based on clustering organization and linguistic feedback.

BACKGROUND OF THE INVENTION

Information retrieval has become an increasingly complex task in the electronic and computer arts in view of the recent advancements in technology as well as the proliferation of the Internet. Some estimates have indicated that the World Wide Web (WWW), the fastest-growing segment of the Internet, has increased at a rate of three-thousand per cent every year. Irrespective of the actual rate of growth, it suffices to say that the increase has enriched the amount of information that is available to an Internet user. As a practical matter, the increase in information also has a tendency to increase the number of topics that are similarly related, which can complicate identifying pertinent material on the Internet. For example, a user may desire to find information related to Long Island, N.Y. More specifically, the user may desire to find information related to summer vacation activities. If a user merely attempts to search for information related to Long Island, N.Y., the information likely to be attained will be voluminous, and the vast majority of it unrelated to summer vacation activities. Thus, a user will then have to invest additional time searching through the returned results in order to pick out what is relevant. Conversely, if the user attempts a narrowly defined search (such as Long Island, N.Y., summer vacation activities), the likelihood of obtaining information of relevance may increase, but may come at the expense of missing out on other valuable information that does not fall within the search scope. Thus, a user frequently must choose whether to invest time parsing through highly generalized information, or whether to constrain a search such that only relevant information is obtained at the expense of foregoing other valuable information.

As is well-known in the art, clustering is a term that is used to describe the process of finding and arranging information in groups. The groups themselves are frequently referred to as clusters, and each member or element of a cluster shares a common property. As is understood in the art, the usage of clusters aids in organizing highly generalized information based on common properties, topics, and themes.

Previous practices have used clustering techniques to present information as a first set of clusters responsive to an initial search engine query. Thereafter, if a user wanted to refine a search, the previous practices implemented what is known in the art as "query refinement," wherein an entirely new search would be conducted generating a second set of clusters. This method of refining search results proved to be disadvantageous, however, given the disconnect between the first set of search results and the second set of search results, leading to a discontinuous search experience which can confuse the user who desires navigational help in exploring the current set of search results.

Thus, what is needed in the art is an improved technique for clustering search results

BRIEF SUMMARY OF THE INVENTION

The following presents a simplified summary of the invention in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

To overcome limitations in the prior art described above, and to overcome other limitations that will be apparent upon reading and understanding the present specification, aspects of the present invention are directed to a novel method, system and apparatus that generates search results responsive to a search engine query, organizes the search results as a first set of clusters, and further generates a second set of clusters.

A first aspect of the invention provides for the generation of the second set of clusters responsive to an indication to recluster the search results.

A second aspect of the invention provides for the generation of the second set of clusters based on linguistic feedback.

A third aspect of the invention provides for the removal of at least one cluster from the first set of clusters responsive to the generation of the second set of clusters.

A fourth aspect of the invention provides for the removal from the second set of clusters a number of clusters from the first set of clusters, wherein the number removed is a function of time that elapses between the generation of each of the first and second sets of clusters.

These and other aspects of the invention generally relate to entering one or more expressions as a search query, generating search results responsive to the entered search query, generating a first set of clusters to organize the search results based on a theme or topic, optionally revising the first set of clusters based on an indication to do so, generating a second set of clusters responsive to the indication. Subsequent clusters may further be generated responsive to further indications to do so. Some or all of the various sets of clusters may be displayed on a display device. The decision to recluster may be responsive to user input, e.g., resulting from the initially displayed clusters not including the information the user is looking for. The newly generated clusters may exclude any previously viewed clusters in an attempt to provide more useful or additional information desired by the user.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION OF THE INVENTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope of the present invention.

Figure 1:
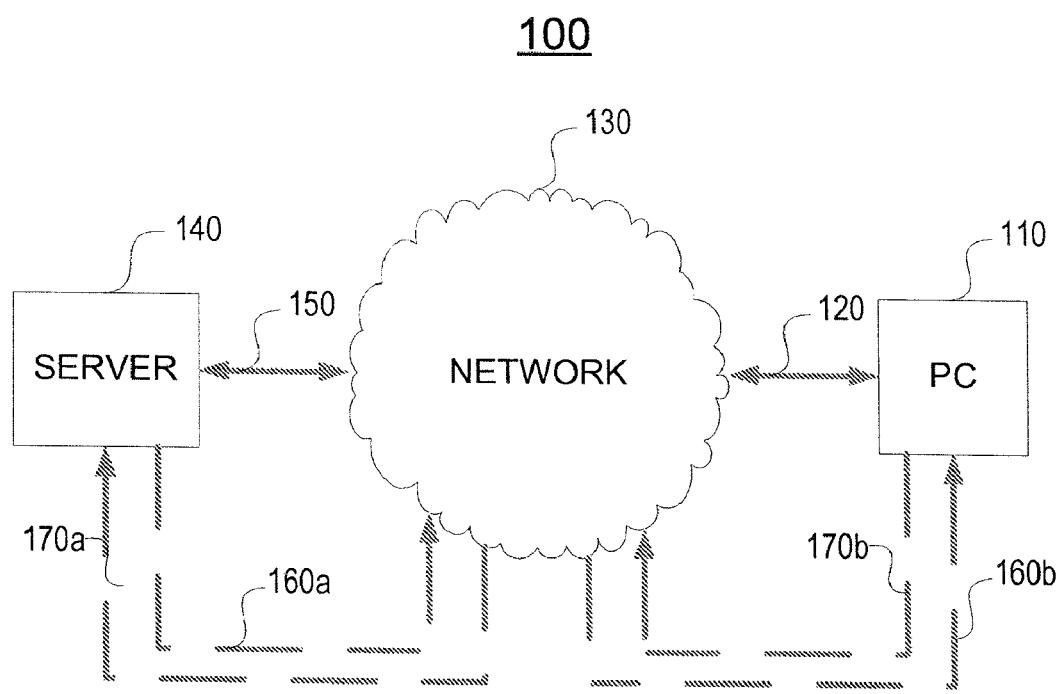
FIG. 1 illustrates a computing environment suitable for carrying out one or more aspects of the invention.

FIG. 1 generally illustrates a computing environment 100 suitable for carrying out one or more aspects of the present invention. For example, FIG. 1 illustrates a personal computer (PC) 110 connected to a network 130 via a connection 120. Network 130 may include the Internet, an intranet, wired or wireless networks, or any other mechanism suitable for facilitating communication between computing platforms in general. FIG. 1 also depicts a server 140 connected to the network 130 via a connection 150. By virtue of the connectivity as shown, PC 110 and server 140 may communicate with one another. Such communications may enable the exchange of various types of information. For example, the communications may include data to be exchanged between PC 110 and server 140. The communications may further include additional information such as control information.

Connections 120 and 150 illustrate interconnections for communication purposes. The actual connections represented by connections 120 and 150 may be embodied in various forms. For example, connections 120 and 150 may be hardwired/wireline connections. Alternatively, connections 120 and 150 may be wireless connections. Connections 120 and 150 are shown in FIG. 1 as supporting bi-directional communications (via the dual arrow heads on each of connections 120 and 150). Alternatively, or additionally, computing environment 100 may be structured to support separate forward (160a and 160b) and reverse (170a and 170b) channel connections to facilitate the communication.

Computing environment 100 may be carried out as part of a larger computer network consisting of one or more PCs 110 and/or one or more servers 140. For example, server 140 may support a plurality of PCs 110, and may communicate with each of the PCs 110 using one or more communication protocols. Alternatively, or additionally, PC 110 may communicate with a plurality of servers 140, again using one or more communication protocols. Furthermore, computing environment 100 may include one or more intermediary nodes (not shown) that may buffer, store, or route communications between PC 110 and server 140.

Figure 2:
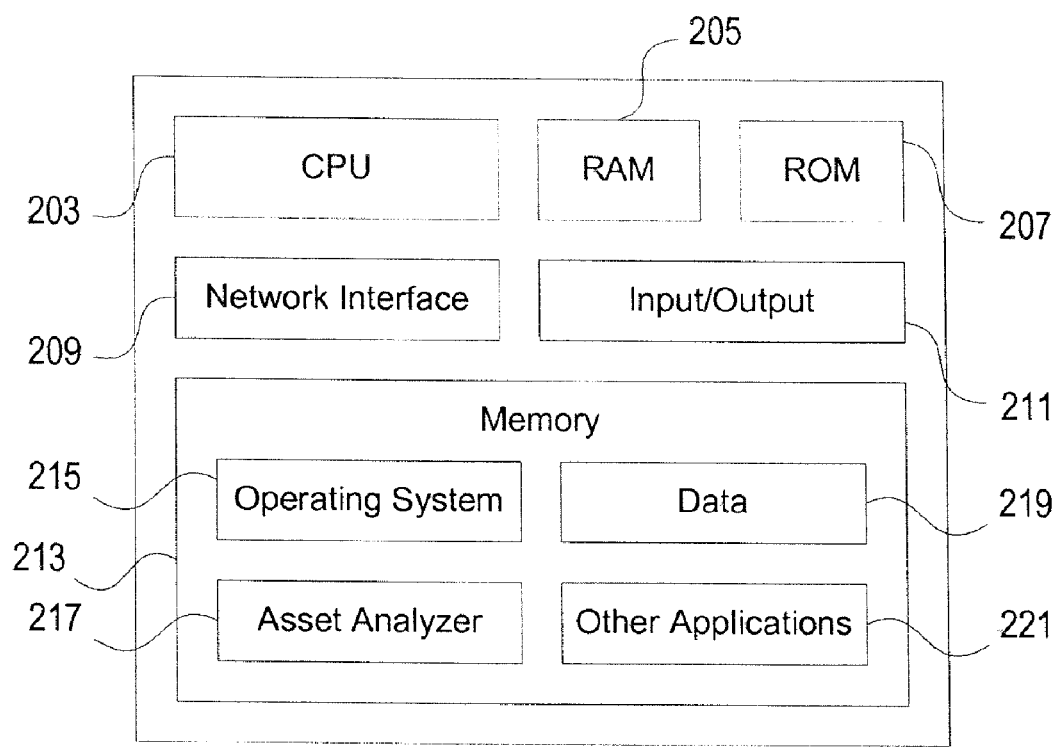
FIG. 2 illustrates a data processing architecture suitable for carrying out one or more aspects of the invention.

FIG. 2 illustrates a computer 200 that represents a generic computing device, e.g., a desktop computer, laptop computer, notebook computer, network server, portable computing device, personal digital assistant, smart phone, mobile telephone, terminal, distributed computing network device, or any other device having the requisite components or abilities to operate as described herein. Computer 200 may include central processing unit or other processor 203, RAM or other volatile memory 205, ROM or other boot memory 207, network interface(s) 209 (e.g., Ethernet, wireless network interface, modem, etc.) through which computer 200 connects to a network (e.g., Internet, LAN, WAN, PAN, etc.), input/output port(s) 211 (e.g., keyboard, mouse, monitor, printer, USB ports, serial ports, parallel ports, IEEE 1394/Firewire ports, and the like), and non-volatile memory 213 (e.g., fixed disk, optical disk, holographic storage, removable storage media, flash drive, etc.). Computer 200 may store various programs, application, and data in memory 213, including, but not limited to, operating system software 215, asset analyzer software 217, data 219 (e.g., historical data including past search results, and other data described herein), and other application(s) 221.

Computer program product implementations may include a series of computer instructions fixed either on a tangible medium, such as a computer readable medium (e.g., a diskette, CD-ROM, ROM, DVD, fixed disk, etc.) or transmittable to computer system 200, via a modem or other interface device 209, such as a communications adapter connected to a network over a medium, which is either tangible (e.g., optical or analog communication lines) or implemented wirelessly (e.g., microwave, infrared, or other transmission techniques). The series of computer instructions may embody all or part of the functionality with respect to the computer system, and can be written in a number of programming languages for use with many different computer architectures and/or operating systems, as would be readily appreciated by one of ordinary skill. The computer instructions may be stored in any memory device, such as a semiconductor, magnetic, optical, or other memory device, and may be transmitted using any communications technology, such as optical infrared, microwave, or other transmission technology. Such a computer program product may be distributed as a removable medium with accompanying printed or electronic documentation (e.g., shrink wrapped software), preloaded with a computer system (e.g., on system ROM or fixed disk), or distributed from a sever or electronic bulletin board over a network (e.g., the Internet or World Wide Web). Various embodiments of the invention may also be implemented as hardware, firmware or any combination of software (e.g., a computer program product), hardware and firmware. Moreover, the functionality as depicted may be located on a single physical computing entity, or may be divided between multiple computing entities.

Figure 3:
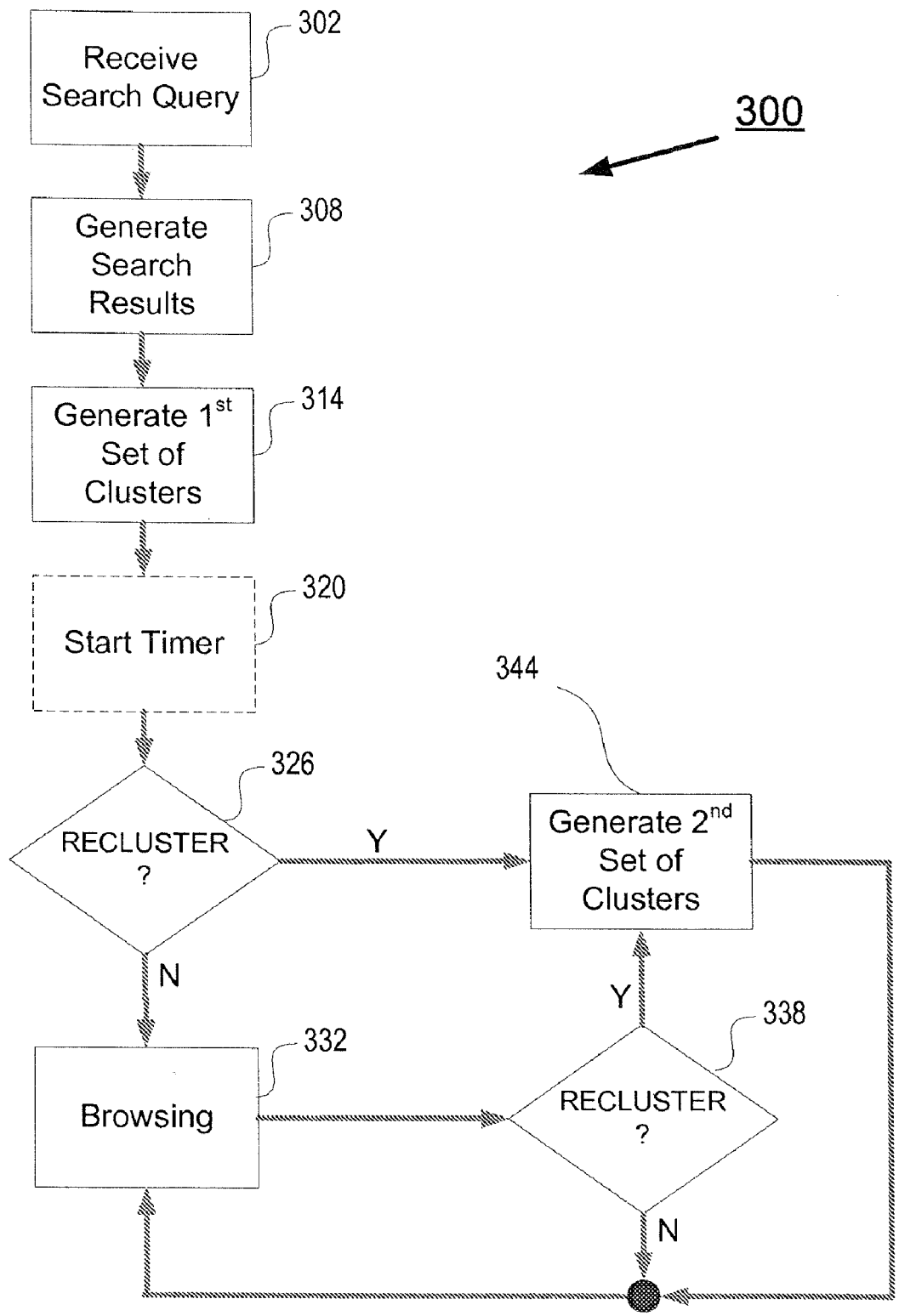
FIG. 3 illustrates a flow chart depicting a method suitable for carrying out one or more aspects of the clustering algorithm described herein.

FIG. 3 depicts a flow chart describing a method 300 suitable for carrying out one or more clustering operations as described herein. Method 300 may be executed on any suitable computing platform (e.g., PC 110). More specifically, method 300 may be executed as a part of a web browser, a search engine or any other query-retrieval based platform, interface, or function. For example, in step 302 a search query is received by a server 140 (FIG. 1). The search query itself may include letters, numbers, characters or any other representations, such as symbols. In general, the search query may be related to any topic, item, or theme that a user has an interest in obtaining more information on. After receiving the search query in step 302, the method proceeds to generate search results in step 308. Any search technology may be used, now known or later developed. Generally, the search results generated in step 308 will include multiple items. In some instances, particularly where the search query is narrowly defined, the search results may include only one item. In step 314 a first set of clusters is generated, which are used to hold the search results generated in step 308. The clusters may be created using any technique now known or later developed. The first set of clusters may be presented on a display device, such as a computer monitor, to enable a user to view the first set of clusters.

Thereafter, in optional step 320, a timer may be started to keep track of how long the first set of clusters has been visible on the display device. In step 326 method 300 waits for further indication before proceeding based on whether a request to recluster the search results has been received. If an indication to recluster has been received in step 326, then method 300 proceeds to recluster by generating a second set of clusters in step 344. If in step 326 an indication to recluster has not been received, then general browsing activities occur in step 332, wherein a user may optionally navigate through the clusters and the corresponding search results. The user at any time can enter a new search query, and restart the process at step 302.

At any time after browsing step 332 has been entered into if there is an indication to recluster, method 300 proceeds to recluster by generating a second set of clusters in step 344. Following step 344, steps 320-338 are effectively replicated (not shown), thereby potentially enabling subsequent browsing and/or reclustering operations (e.g., the generation of a third set of clusters, and so on) to take place. As such, one of ordinary skill in the art would appreciate that method 300 may be viewed as a 'loop', wherein the method generally includes the steps of generating a set of clusters, displaying the clusters, and revising/reclustering the clusters based on an indication to revise, with the option of navigating the clusters and/or results within every iteration.

Unlike previous clustering techniques, aspects of the present invention prevent previously reviewed clusters from being included in subsequent sets of clusters based on the same search results. The process of excluding one or more clusters in a subsequent reclustering operation may be implemented based on literal phraseology, thereby allowing similarly titled clusters in subsequent sets of clusters. For example, if a first set of clusters includes a cluster entitled "beaches", a subsequent set of clusters may exclude the cluster "beaches", yet still include a cluster entitled "beach". Alternative embodiments may use equivalence classes to exclude clusters with titles having a similar meaning as already reviewed clusters. For example, if a user wanted to plan a summer vacation on Long Island, N.Y., and more specifically, wanted to attend one of the numerous beaches there, the user may become frustrated, and perhaps even begin to lose confidence in the overall operation, if a first set of clusters included a cluster entitled "beach", only to have a second or subsequent set of clusters include a cluster of a similar title such as "shoreline". Thus, in at least one embodiment, a library of equivalence classes may be maintained, wherein each equivalence class includes a plurality of terms or phrases that are treated as similar or identical. For example, one equivalence class may include the terms "beach", "shoreline", "seashore", "seaside", "coast", "shore", "coastline" and the like. The equivalence class may also include both the plural and singular form of the various terms and phrases. Still another equivalence class related to picture taking might include terms such as "pie", "pies", "photo", "photos", "image", "images", "imagery", "pictorial", "pictorials", "photograph", "photographs", "picture", "foto", "fotos", "photo gallery" and the like. Thus, equivalence classes may be used to aggregate information that incorporates different linguistic expressions relating to a common topic or theme. The utilization of equivalence classes may aid in the process of information retrieval, because a user will be able to formulate a judgment as to whether a given topic is of relevance without having to individually consider the various linguistic expressions that may generally refer to the given topic. Furthermore, in at least one embodiment, an equivalence class may maintain commonly misspelled words or phrases that may be used to exclude similarly misspelled clusters. Thus, for example, in the preceding equivalence class related to picture taking, the equivalence class may also include a misspelled term such as "imagry" to compensate for a common misspelling of the term "imagery".

As described above in conjunction with method 300, method 300 may receive an indication to recluster (e.g., in steps 326 or 338). The indication may be in response to a user request to revise or recluster the results. Alternatively, or additionally, the indication may be the result of a timer reaching a threshold value. For example, method 300 illustrates that a timer may be started (e.g. step 320) to keep track of how long a set of clusters (e.g., the first set of clusters generated in step 314) has been displayed. The timer may then be used to trigger a reclustering operation after a certain amount of time has elapsed. Alternatively, or additionally, the timer may be used in the process of determining the actual subsequent set of clusters themselves. For example, if a user enters a search query such as "Long Island, N.Y.", a first set of clusters may include the following clusters: (1) Nassau, Suffolk, (2) Pictures, (3) Long Island City, and (4) Club. Assuming that a typical user determines whether a particular cluster is of interest in two seconds, if a user provides an indication of a desire to recluster within a time-window of zero to two seconds, the first cluster ((1) Nassau, Suffolk) may be excluded from the second set of clusters while the remaining clusters ((2) Pictures, (3) Long Island City, and (4) Club) may remain eligible for inclusion in the second set of clusters, provided the relevant clustering criteria are met. The rationale behind the decision to remove (only) the first cluster is that, based on the amount of elapsed time, a user is likely uninterested in the first cluster ((1) Nassau, Suffolk), but has not taken enough time to consider the other clusters. On the other hand, if the user provided an indication of a desire to recluster within a time-window of two to four seconds, the first two clusters ((1) Nassau, Suffolk, (2) Pictures) may be excluded from the second set of clusters while the remaining clusters ((3) Long Island City, and (4) Club) may be eligible for inclusion in the second set of clusters, provided the relevant clustering criteria are met. Thus, in this example, if the user provided an indication of a desire to recluster after six or more seconds have elapsed, the second set of clusters would exclude from eligibility all of the clusters from the first set of clusters. The two second period described in this example may be modified as needed or desired to a different value. For example, the method may determine the length of time based on the length of the cluster titles that are displayed, thus correlating the assigned time to the average user's reading speed. Alternatively, or additionally, the method may allow a user to manually enter a desired length of time, thereby enabling the operation to be tailored to each specific user. The foregoing example reflects the notion (by virtue of the exclusion of the first cluster despite a potential time lapse of zero seconds between the generation of the first set of clusters and the indication to recluster) that it is better to introduce some modification in subsequent sets of clusters than it is to simply reproduce the corresponding set of clusters, even if the corresponding set of clusters is the "best" set of clusters in accordance with one or more quality criterion. Experience in the art has indicated that the average user quickly becomes impatient, and may even perceive the method or architecture to be broken, when subsequent clusters (or results) are identical to previous iterations. To this end, in at least one embodiment of the present invention, the reclustering operation may generate a subsequent set of clusters that excludes all of the clusters visible or included in the preceding set of clusters, irrespective of elapsed time.

The choice of titles to be applied to a cluster may be based on an understanding of linguistics. Moreover, the decision as to what clusters to exclude may also be based on this understanding of linguistics. The term "of" is classified as a preposition in the English language with respect to the traditional parts of speech. Other prepositional phrases include terms such as "about", "by", "within", and the like. Prepositional phrases (and other terms, for that matter, that merely serve the purpose of connecting together various parts of a phrase or are otherwise non-informative) are referred to in the art as stopwords. For purposes of clustering, stopwords are individual words that might not be allowed to appear by themselves as the title of a cluster, so a user will not see a folder called "by". Furthermore, in at least one embodiment, a cluster title must consist of at least one non-stopword, so a cluster title such as "of the" would also be disallowed. However, a stopword may appear as part of a cluster title that has at least one non-stopword, such as in "United States of America". A criterion for determining which words belong to a stopword-dictionary may be established. The stopword-dictionary may be automatically preloaded/initialized, or it may be built manually via user entry. Moreover, the stopword-dictionary may be updated automatically, manually, or in some combination thereof. An example is the scenario wherein a user desires more information related to the "USA", and enters that phrase as a corresponding search query. In response to the entered search query in this example, a cluster may be returned entitled "United States of America". The user, however, may be more interested in information directly related to the Sep. 11, 2001, terrorist attacks, and their subsequent impact on the United States of America. Thus the phrase "United States of America" may be too general to be of immediate use to the user, or the user may have examined the cluster already and is interested in seeing other clusters. In a subsequent reclustering operation, not only will the phrase "United States of America" be excluded, but other combinations of words making up the phrase may also be linguistically excluded. For example, the sub-phrases "United States", "States of", "of America", "United", "States", and "America" may subsequently be excluded, as well as linguistic variants of these sub-phrases such as "American". In at least one embodiment, each phrase or sub-phrase that merits exclusion is, upon starting the reclustering, transformed at parsing time into a unique but temporary new name, say, FOOBAR823, which is then declared a stopword for the reclustering. One reason for doing this is to handle any user interface issues that may arise from the alternative embodiment of merely transforming the sub-phrase into the null string "", which could prevent the normal operation of bolding of keywords within the search results, or of de-duplication which uses thresholds for deciding whether search results are duplicates and so should be condensed into a single search result. The treatment of the various combinations as stopwords may be on a temporary basis for the duration of a given search. Alternatively, the stopwords may be added to a stopword-dictionary so as to treat the combinations as stopwords on a more permanent basis. Thus, the use of stopwords and/or the exclusion of whole or partial cluster titles from subsequent sets of clusters enhances the user experience by allowing novel, desirable clusters to appear, without harming the static nature of the search results on the rest of the screen, since ideally the reclustering should not alter the search results themselves or their ranking, only the appearance or ordering of the clusters themselves.

In contrast to the preceding example regarding exclusion of sub-phrases such as "United States" in subsequent reclustering operations following an initial search related to "USA", in at least one embodiment, adjustments may be made to the cluster titles on a finer basis so as to not so quickly discard of themes that may be of interest to a user. For example, a user may enter the search query "Pittsburgh". The returned first set of clusters may include "University", "Politics", "Steelers", "Three Rivers", "Carnegie Library", "Mellon Institute", and "Mayor". A secondary theme that the user may be interested in is "Carnegie Mellon University", which is a combination of terms included in the first set of clusters in this example. A literal feedback of all of the first set of clusters could result in the revised (e.g., second) set of clusters excluding the desired theme "Carnegie Mellon University". Thus, it would be desirable in some instances not to re-run the original clustering algorithm, but instead revise the clusters based on making post-hoc adjustments to the pre-computed (e.g., first set of cluster) themes. Thus, in contrast to the preceding examples with respect to the search query "USA", the exclusion of clusters in subsequent reclustering operations may be conducted on a finer basis so as to not as quickly discard topics or themes that in actuality may be of interest.

Figure 4:
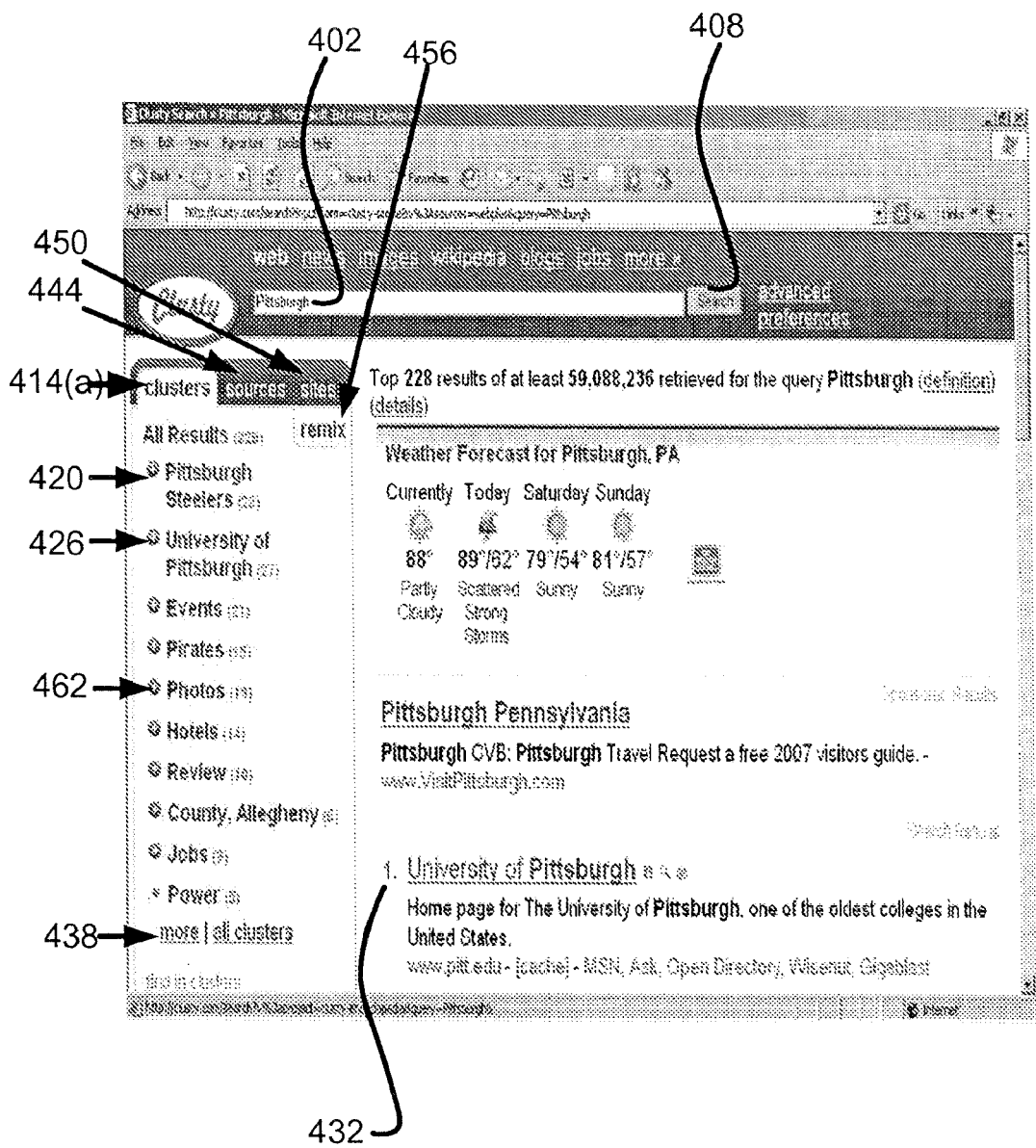
FIG. 4 illustrates an example interface for enabling interaction between a user and aspects of the invention described herein.

FIG. 4 illustrates an example interface 400 for interacting with a user via the use of a computing device (e.g., PC 110). More specifically, interface 400 is a web browser window; in FIG. 4 the web browser itself is Internet Explorer as produced by the Microsoft Corporation of Redmond, Wash. Interface 400 includes a search box 402 to enable a user to enter a search engine query. FIG. 4 reflects an instance where a user has entered the term "Pittsburgh" as the search engine query. Interface 400 includes a search button 408 to enable a user to indicate the desire to perform a search based on the entered search engine query. After the user presses search button 408, the search engine is engaged and subsequently generates search results. The results themselves are then placed into (a first set of) clusters 414(a) based on theme or topic. In FIG. 4, clusters 414(a) include a cluster 420 entitled "Pittsburgh Steelers", a cluster 426 entitled "University of Pittsburgh", a cluster 462 entitled "Photos" and additional clusters (not labeled). Moreover, interface 400 also includes the search results themselves. For example, FIG. 4 shows a first search result 432 which is indicative of a link to the "University of Pittsburgh" home page. A user may subsequently select the result 432 (by clicking on the corresponding hyperlink using a mouse, for example) to navigate to the University of Pittsburgh home page. If the visible clusters are not of immediate interest, the user can select either of the "more" or "all clusters" hyperlinks (collectively referred to as 438 in FIG. 4) to either increase the number of clusters displayed or to show all clusters under the initial clustering scheme, respectively. FIG. 4 includes a source tab 444 and a sites tab 450 to both provide the user additional information with respect to the search results as well as to enable the user to tailor the search. For example, the source tab 444 may present to the user all of the sites that have contributed to the search results. Similarly, the sites tab 450 may provide information as to one or more domains (e.g., .com, .gov, .edu, etc.) from which the search results originate. Each of source tab 444 and sites tab 450 may enable a user to constrain or otherwise restrict the origins from which the search results will be obtained. For example, source tab 444 or sites tab 450 may enable a parent to restrict a child's access to a particular site, or access to a more generalized subject matter or theme. Additionally, or alternatively, the invention described herein may incorporate user-name, password, and other such features that may further enhance security and otherwise provide for customized access rights. As illustrated in FIG. 4, a remix button 456 may be included to enable a user to indicate a desire to initiate a revise or recluster operation. Upon selection of remix button 456 (e.g., via a mouse click selection), a reclustering operation takes place.

Figure 5:
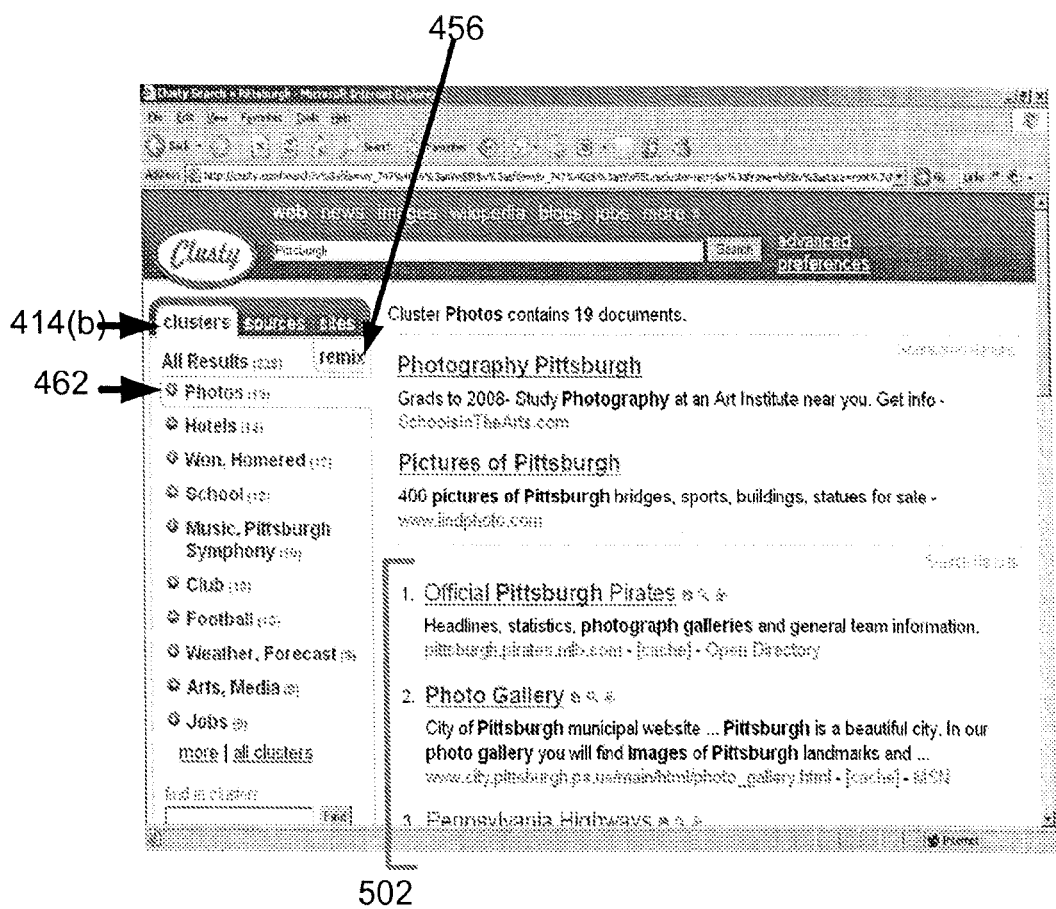
FIG. 5 illustrates example results of revising a first set of clusters as illustrated in FIG. 4 and as described herein.

FIG. 5 illustrates the results of reclustering the clusters 414(a) shown in FIG. 4. More specifically, FIG. 5 illustrates the generation of a second set of clusters 414(b). Clusters 414(b) include some (but not all) of the same clusters included in clusters 414(a). For example, both clusters 414(a) and 414(b) include cluster 462 "Photos", however, cluster 414(b) does not include cluster 420 "Pittsburgh Steelers". This is the result of a heuristic determination that the user might not have viewed cluster 462 "Photos" when it was included with clusters 414(a), and thus, it was subsequently included in clusters 414(b). FIG. 5 also illustrates a screen display after a user selects cluster 462 "Photos" (e.g., via the user clicking a mouse on cluster 462 "Photos"), which displays a listing of search results 502 specifically tailored to material related to photos and the like.

Figure 6:
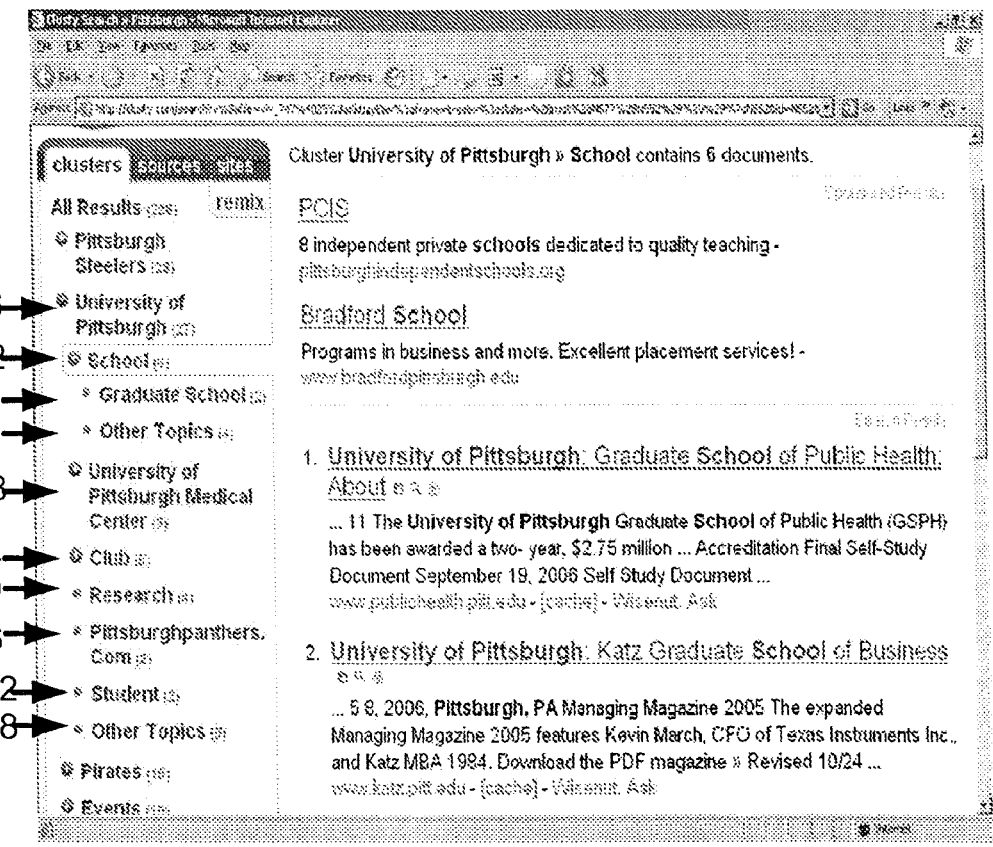
FIG. 6 illustrates the utilization of the interface of FIG. 4 to further expand a cluster, thereby revealing subclusters as described herein.

FIG. 6 illustrates the expansion of cluster 426 "University of Pittsburgh". The expansion of cluster 426 reveals an arrangement of primary subclusters 602-628. More specifically, the subclusters residing immediately beneath cluster 426 include 602 "School", 608 "University of Pittsburgh Medical Center", 614 "Club", 620 "Research", 626 "Pittsburghpanthers.Com", 632 "Student" and 638 "Other Topics". Subcluster 602 "School" has been further expanded to reveal subclusters residing beneath subcluster 602 "School". More specifically, 644 "Graduate School" and 650 "Other Topics" reside beneath 602 "School". As will be noted in FIGS. 4-6, each resulting cluster or subcluster shows the number of search results that resides within that cluster or subcluster. In FIGS. 4-6, the number of search results is shown immediately to the right of the respective cluster and subcluster titles. Thus, a user is provided with a visual indication as to the extent of coverage a given topic has received within each cluster or subcluster in terms of quantity of search results. Other options, such as reflecting a perceived relevance of each cluster or subcluster compared with the search engine query via a rating scale, are well within the scope of the present invention.

Figure 7:
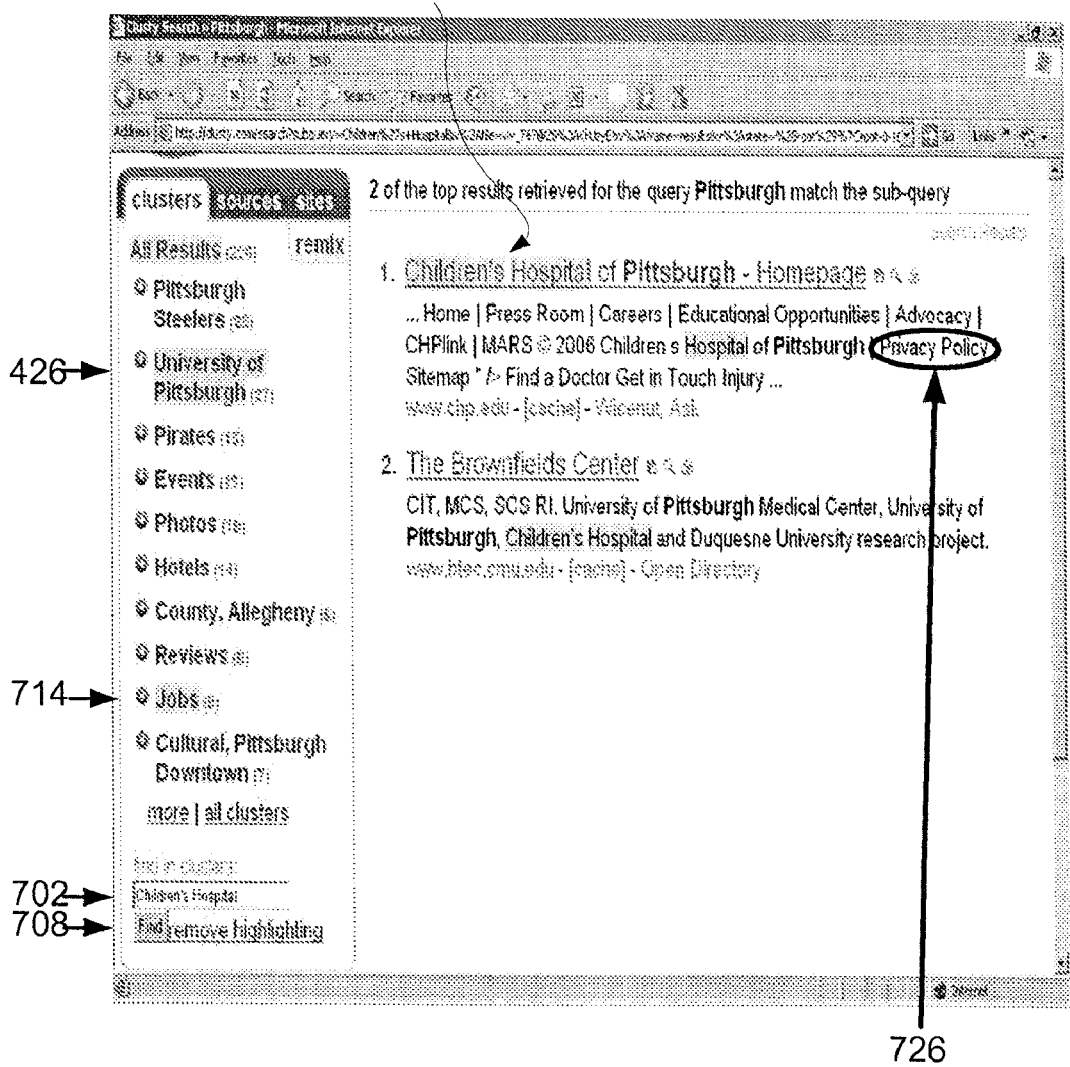
FIG. 7 illustrates the utilization of the interface of FIG. 4 to further refine and locate search results within one or more clusters as described herein.

FIG. 7 illustrates a scenario wherein a user, having already navigated various topics, desires to focus her research on a more specific topic. For example, a user, having already navigated through the various clusters related to Pittsburgh, may determine that she wants to give back to the greater Pittsburgh community by providing a donation to one of its charities. More specifically, her fondness for youngsters compels her to want to donate money to a children's hospital, however, she is unsure of its official name, much less where to direct the funds to. As such, she enters the phrase "Children's Hospital" in a 'find in clusters' box 702 and then selects the Find button 708. Clusters 426 "University of Pittsburgh" and 714 "Jobs" are subsequently highlighted, providing an indication that results within each relate to the phrase "Children's Hospital". Moreover, result 720 provides a direct link to the Children's Hospital of Pittsburgh—Homepage, which can provide the user with additional information related to, among other things, who she should write her sizeable check out to. Conversely, if the user decides that after focusing her search on Children's Hospital that she would rather donate her money to another charity in the Pittsburgh Community, the phrase Children's Hospital (and its various derivatives) may also be excluded in a subsequent reclustering operation. Moreover, the information visible on the search page itself may also be indicative of various themes that may be excluded in subsequent reclustering operations. For example, it may be determined that the user has likely viewed "Privacy Policy" 726. Thus, a reasonable inference may be that the user has no interest in privacy policies or the like, and related themes may be excluded in subsequent reclustering operations.

The benefits of clustering may be realized even in the absence of a formal search query. For example, the act of opening a window (e.g., a web browser window) on a computer may automatically generate a first set of clusters related to a certain topic. For example, upon selecting a "News" link, a web site may automatically cluster the top N (e.g., one hundred) news stories of the day, based on a determination that the selection of the "News" link is in effect an informal query for news-related items. Thereafter, a subsequent reclustering operation may generate a second set of clusters, thus providing a user with a revised view of the top N news stories. The theme (e.g., news stories) may be selected by default. Alternatively, the theme may be selected or configured by a user. Determinations of an informal query may comprise many alternatives, for example, the selection of a topic or the identification of any group of pre-existing items (e.g., chapters or paragraphs in a book, volumes in a library, doctoral thesis papers from a given year at a given university, etc.). The informal query may thus take the form of any request for items matching some predetermined criteria.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Alternative or additional features are available that are well within the scope of the present invention. For example, a plurality of languages may be supported. Furthermore, an option may be presented to a user to select a language from the different types of languages available. Still further, the user may have the ability to constrain the sources from which the search results are attained. Moreover, the user may have the ability to constrain, restrict, or otherwise modify the clusters described herein to meet one or more user criterion. For example, a user may have a set template of clusters that she would like all search results deposited into, irrespective of how closely they actually correlate with the designated clusters. The inventive system may then perform a "best fit" analysis to force the search results into the designated clusters.

What is claimed is:

1. A non-transitory computer-readable medium comprising instructions for execution by a computer, the instructions implementing steps in a method comprising:

storing search results at a server based on a search engine query, wherein said search results comprise a plurality of items;

generating at the server a first set of clusters responsive to the search engine query, wherein each of said items is associated with at least one cluster in said first set of clusters;

sending the first set of clusters to a terminal configured to display the first set of clusters;

receiving at the server user input consisting of an indication to recluster the search results;

generating at the server a second set of clusters, wherein said second set of clusters excludes one or more clusters from said first set of clusters, and wherein each of said items is associated with at least one cluster in said second set of clusters; and sending the second set of clusters to the terminal configured to display the second set of clusters,
wherein each cluster is defined by a cluster title, and wherein generating at the server a second set of clusters comprises excluding from the second set of clusters one or more cluster titles used in said first set of clusters, excluding the literal phraseology of at least one cluster title in the first set of clusters from the second set of clusters, and excluding a linguistic equivalence class corresponding to at least one cluster title in the first set of clusters from the second set of clusters, and
wherein generating the second set of clusters comprises excluding each displayed cluster of the first set of clusters from the second set of clusters.

2. The non-transitory computer readable medium of claim 1, wherein each generating step comprises:
determining one or more linguistic equivalence classes, each linguistic equivalence class identifying a primary term and one or more corresponding linguistically similar terms, and
for each linguistic equivalence class, treating all linguistically similar terms within the search results as identical to the corresponding primary term.

3. The non-transitory computer readable medium of claim 1, wherein generating the second set of clusters comprises allowing the second set of clusters to use a portion of a title of at least one cluster within the first set of clusters.

4. The non-transitory computer readable medium of claim 1, wherein the steps of generating each of the first and second set of clusters excludes clusters that would otherwise only include stopwords.

5. A method, implemented in a computer, comprising:
determining in the computer a first set of clusters to display from a plurality of search query results, each of the plurality of search query results being associated with at least one cluster in the first set of clusters;
determining, in the computer, a title to display of at least one cluster in the first set of clusters;
after determining the title to display of the at least one cluster in the first set of clusters, identifying an input indication to recluster the plurality of search query results;
determining in the computer a second set of clusters to display, which excludes one or more clusters from the first set of clusters, each of the plurality of search query results being associated with at least one cluster in the second set of clusters.

6. The method of claim 5, further comprising:
determining an elapsed amount of time between a time when the title of at least one cluster in the first set of clusters is displayed and a time when the input indication to recluster the plurality of search query results is identified, wherein
an amount of clusters of the one or more clusters excluded from the second set of clusters increases as the elapsed amount of time increases.

7. The method of claim 5, further comprising:
determining a linguistic equivalence class of each cluster in the first set of clusters; and
when determining the second set of clusters, further excluding the linguistic equivalence class of each cluster in the first set of clusters.

8. The method of claim 5, further comprising:
determining a title to display of at least one cluster in the second set of clusters, wherein identifying an input indication, determining the second set of clusters, and determining the title to display of a least one cluster in the second set of cluster are continuously repeated as a loop.

9. The method of claim 5, wherein:
identifying the input indication to recluster the plurality of search query results includes identifying a reclustering trigger that is automatically generated, without a user interaction, after a predetermined amount of time has elapsed after determining the title to display of at least one cluster in the first set of clusters.

10. A non-transitory computer-readable medium comprising instructions for execution by a computer, the instructions implementing the method comprising:
determining a first set of clusters to display from a plurality of search query results, each of the plurality of search query results being associated with at least one cluster in the first set of clusters;
determining a title to display of at least one cluster in the first set of clusters;
after determining the title to display of the at least one cluster in the set of clusters, identifying an input indication to recluster the plurality of search query results;
determining a second set of clusters to display, which excludes one or more clusters from the first set of clusters, each of the plurality of search query results being associated with at least one cluster in the second set of clusters.

11. The non-transitory computer-readable medium of claim 10, wherein the method further comprises:
determining an elapsed amount of time between a time when the title of at least one cluster in the first set of clusters is determined and a time when the input indication to recluster the plurality of search query results is identified, wherein
an amount of clusters of the one or more clusters excluded from the second set of clusters increases as the elapsed amount of time increases.

12. The non-transitory computer-readable medium of claim 10, wherein the method further comprises:
determining a linguistic equivalence class of each cluster in the first set of clusters; and
when determining the second set of clusters to display, further excluding the linguistic equivalence class of each cluster in the first set of clusters.

13. The non-transitory computer-readable medium of claim 10, wherein the method further comprises:
determining a title to display of at least one cluster in the second set of clusters, wherein
identifying an input indication, determining the second set of clusters, and determining the to display title of a least one cluster in the second set of cluster are continuously repeated as a loop.

14. The non-transitory computer-readable medium of claim 10, wherein:
identifying the input indication to recluster the plurality of search query results includes identifying a reclustering trigger that is automatically generated, without a user interaction, after a predetermined amount of time has elapsed after determining the title to display of at least one cluster in the first set of clusters.

15. An apparatus comprising:
a processor; and
memory storing computer executable instructions that, when executed by the processor, perform a method of clustering, comprising:

determining a first set of clusters to display from a plurality of search query results, each of the plurality of search query results being associated with at least one cluster in the first set of clusters;

determining a title to display of at least one cluster in the first set of clusters;

after determining the title to display of the at least one cluster in the first set of clusters, identifying an input indication to recluster the plurality of search query results;

determining a second set of clusters to display, which excludes one or more clusters from the first set of clusters, each of the plurality of search query results being associated with at least one cluster in the second set of clusters.

16. An apparatus according to claim 15, wherein the method of clustering further comprises:

determining an elapsed amount of time between a time when the title of at least one cluster in the first set of clusters is displayed and a time when the input indication to recluster the plurality of search query results is identified, wherein an amount of clusters of the one or more clusters excluded from the second set of clusters increases as the elapsed amount of time increases.

17. An apparatus according to claim 15, wherein the method of clustering further comprises:

determining a linguistic equivalence class of each cluster in the first set of clusters; and when determining the second set of clusters, further excluding the linguistic equivalence class of each cluster in the first set of clusters.

18. An apparatus according to claim 15, wherein the method of clustering further comprises:

determining a title to display of at least one cluster in the second set of clusters, wherein identifying an input indication, determining the second set of clusters, and determining the title to display of a least one cluster in the second set of cluster are continuously repeated as a loop.

19. An apparatus according to claim 15, wherein the method of clustering further comprises:

identifying the input indication to recluster the plurality of search query results includes identifying a reclustering trigger that is automatically generated, without a user interaction, after a predetermined amount of time has elapsed after determining the title to display of at least one cluster in the first set of clusters.

* * * * *